Figure 1:
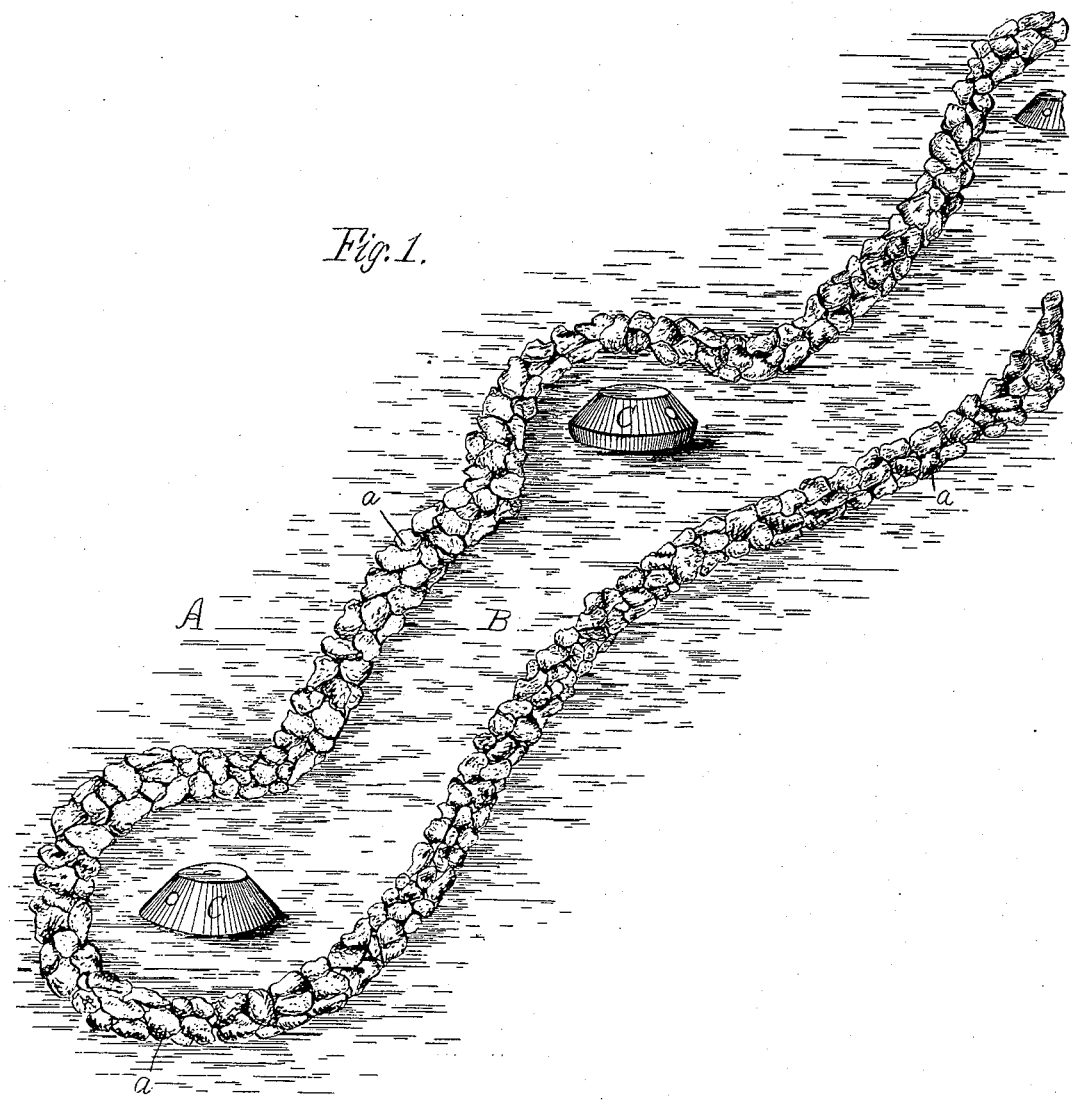

(No Model.) 2 Sheets—Sheet 1.

T. L. STURTEVANT.
FORTIFICATION FOR COAST AND HARBOR DEFENSE.

No. 370,501. Patented Sept. 27, 1887.

Witnesses.
E. K. Boynton
H. E. Lodge

Inventor:
Thos. L. Sturtevant.
F. Curtis, Atty.

(No Model.) 2 Sheets—Sheet 2.

T. L. STURTEVANT.
FORTIFICATION FOR COAST AND HARBOR DEFENSE.

No. 370,501. Patented Sept. 27, 1887.

Witnesses.
E. K. Boynton
H. E. Lodge

Inventor.
Thos. L. Sturtevant.
F. Curtis. Atty.

UNITED STATES PATENT OFFICE.

THOMAS LEGGETT STURTEVANT, OF FRAMINGHAM, MASSACHUSETTS.

FORTIFICATION FOR COAST AND HARBOR DEFENSE.

SPECIFICATION forming part of Letters Patent No. 370,501, dated September 27, 1887.

Application filed November 30, 1885. Serial No. 184,315. (No model.)

*To all whom it may concern:*

Be it known that I, THOMAS LEGGETT STURTEVANT, a citizen of the United States, residing at Framingham, in the county of Middlesex and State of Massachusetts, have invented certain new and useful Improvements in Fortifications for Harbor and Coast Defense; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a system of defense for harbors or coasts by the employment of floating batteries in combination with inexpensive banks or walls of earth or masonry raised a short distance above the surface of the water in which the battery floats, the object of my invention being to enable said battery to inflict damage upon an opponent, while being itself practically unassailable.

In the carrying out of my system the following primary elements are essential: first, a floating battery; second, a body of water of sufficient area and depth to float such battery and allow it to be partially submerged therein and protect it from assault by land forces; third, shallow inexpensive banks or walls of earth or masonry to shield the floating battery from raking shots, rams, and torpedoes or other missiles by an attacking force; fourth, provision for enabling the floating battery to be readily raised or lowered in the water with respect to the defenses, in order that its guns may be brought into action above such defenses, in readiness for attack, or lowered below the crest of said defenses to escape serious injury from attack outside of these defenses.

Secondarily, my invention embraces provision for enabling the floating battery to be readily turned in a small compass, or about a stationary axis of rotation, in order that its armament may be brought to bear upon any point of the compass; also, in providing such battery with a propeller or propellers or other motors for enabling it to be rotated or propelled in any given direction in the event of its becoming desirable to change its location.

Details of my invention will be hereinafter duly explained.

Figure 2:
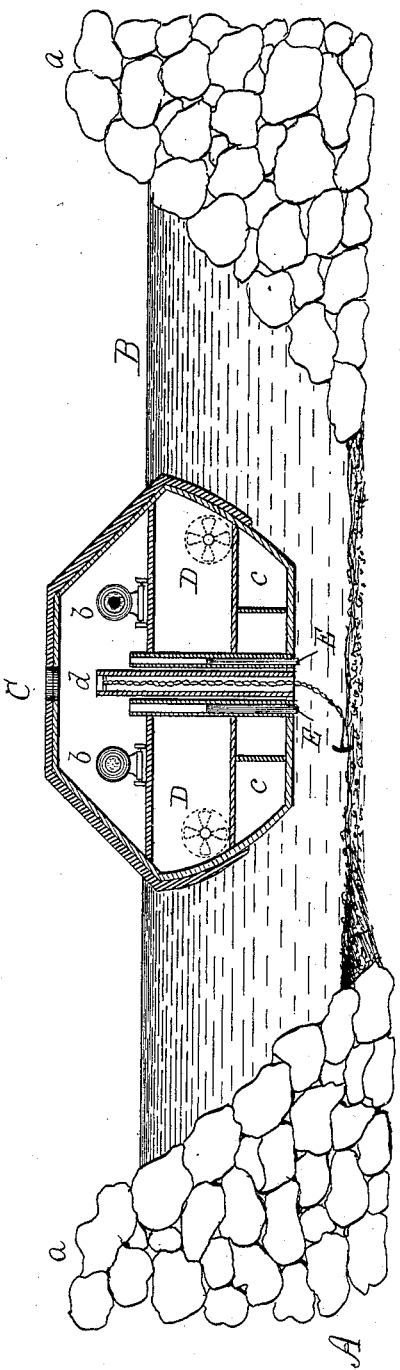
Figure 3:
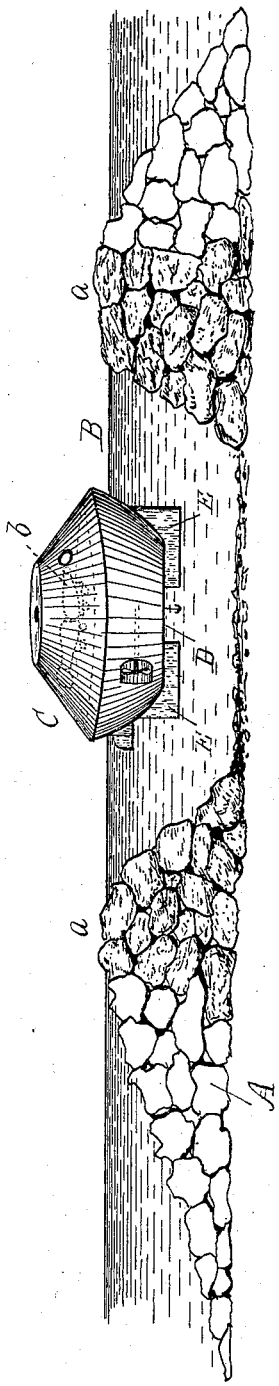

The drawings accompanying this specification represent, in Figure 1, a general bird's-eye view, and Fig. 2 a vertical transverse section through a fortification embodying my invention. In this drawing the battery is shown as submerged. Fig. 3 is an end elevation of the fortification with the battery arranged to advance from place to place.

In the drawings, A represents a comparatively low defense, composed, for instance, of earth, any kind of stone-work, iron, or masonry, according to conditions and facilities for obtaining material, such defense, if on a coast and off shore, to be located at a point where the approaches are shallow water, to prevent access of iron-clads, torpedoes, rams, or other navigable vessels. In rear of this defence I excavate a canal, ditch, or basin, (shown in the drawings at B,) which may be of any desired area or shape and with its bed of such contour in cross-section as practice may determine best, according to the nature of the material composing its banks. In many instances the earth, or earth and stones, thus excavated will provide the necessary material for the defenses.

In lieu of a continuous canal or basin a series of intercommunicating basins may be provided, the outer one of which may, if desired, communicate with tide-water, and entrance to each or all be closed by sinking old heavily-loaded vessels or other obstructions, or by water-gates. This basin or canal is to be filled with water, and the water maintained at a given level by being connected with a suitable water-supply under natural or artificial head, and in many instances advantage may be taken, by means of suitable gates, of flood-tides as a means of filling the basin, or the battery may in some instances be allowed to rise and fall with the tide with respect to the defenses, the tide having free communication with the basin.

The maximum level of the water in the canal or basin is somewhat below the crest *a a* of the defenses, and in such basins or canals I propose to float one or more batteries, C C. These batteries are to be constructed in accordance with the best principles now employed in such vessels, and are to be preferably, as shown in the drawings, circular in form and "iron-clad" and "shot-proof," so called, and are to be armed with such guns or other weapons, b b, as would naturally be employed in coast or harbor defense; and I prefer that these weapons, if guns, shall be arranged tangentially of the vessel, in order that when the latter is raised for attack such guns may be less liable to injury from the shot of an enemy's guns.

I prefer that the vessel or battery C shall be of comparatively shallow draft, in order that it may be readily and easily maneuvered or propelled within its canal or basin or navigated to different localities; and I propose to construct each vessel or battery with water-tight compartments c c, which by suitable machinery may be filled or emptied, as occasion demands, in order that when the battery is to be brought into action these tanks are to be partially or entirely emptied and the vessel lightened and raised until its guns are brought into action above the defenses; and when the vessel is to be shielded from attack the tanks are filled and such vessel partially submerged and lowered behind the defenses, or the vessel may be lowered to load its guns and raised to bring its guns into action.

In the event of an enemy's fire proving too severe the tanks may be filled and the vessel lowered, as before explained, and it will be seen that when in this position the battery is practically unassailable, as but a small portion of its surface is exposed, and the blow could in any event be only a glancing one.

When the battery is to remain for a given period of time in one spot, or in a very small basin or canal, I have provided means for enabling it to be readily and quickly turned about a stationary axis, in order to train its guns to any desired point of the compass. While this may be accomplished in various ways, I have shown in the accompanying drawings one practical plan for effecting the object, which is to employ a water-tight tube located vertically and preferably centrally, or thereabouts, of the vessel, as shown at d, and through this tube the anchoring device is to be passed. This device, as shown, may be an ordinary anchor, the chain of which passes upward through the tube and is provided with suitable swivels to permit the vessel to rotate about it; or, in lieu of the anchor and chain, a stout pile may be inserted in the tube and driven firmly into the bottom of the basin. An alternate form of construction would be to adapt the upper part of the vessel to rotate upon the lower part, the latter, when the vessel is in position for action, being immovably anchored. To effect maneuvers of the vessel about this stationary pivot or axis, I employ, in the present instance, two propellers, D D, upon opposite sides of the hull, although one placed upon one side of the hull will answer this purpose, such propeller or propellers to be operated by suitable engine or engines.

To allow the vessel to be navigated when it is desired to change its locality or mass several batteries at one point, and in the event of the vessel being, as shown in the present instance, a circular one, I employ two propellers, and I employ false or movable keels or center-boards E E, located upon opposite sides (that is, fore and aft) of the hull and at right angles to the plan of action of the propellers. These center-boards counteract any tendency of the vessel to rotary movement, and a rudder is to be employed with them to steer such vessel. If the battery is an ordinary fore-and-aft vessel, the center-boards are, or may be, omitted.

It will be seen that my system of harbor or coast defense, as above described, possesses many valuable and novel features. My batteries are, under all ordinary circumstances, safe from attack by torpedo-boats, since the shallow approaches to the defenses from the sea prevent access of such torpedo-boats, or even of torpedoes; or, if the sea approach should be deep water, the protecting earth-work is sloped gradually into the sea, itself forming a shallow and preventing a too-close approach to the battery. Furthermore, the water surrounding the battery prevents an assault by a land force, and from any source of attack it is practically impossible to "hull" the vessel.

A system of defense of this character may be generally constructed at comparatively low cost as compared with equally-effective iron-clad casemates, heavy earth-works or masonry, or other forms of permanent fortifications. It is enabled to direct a heavy fire upon an enemy, and, when desirable, to protect itself from or return fire. It always remains in calm water, and for this reason the guns may be accurately trained upon an attacking force, and, being capable of central anchorage, it may revolve or maneuver in a very small basin or canal. Should the vessel be accidentally sunk, no loss of life would probably ensue from the cause, as the shallowness of the basin would not permit her to be entirely submerged, or the banks of the canal or basin could be readily reached by swimming.

I claim—

A system of fortification consisting of batteries floating in a body of water inclosed practically upon all sides by an unbroken belt of earth-work surrounding and protecting it, substantially as and for the purposes hereinbefore set forth.

In testimony whereof I affix my signature in presence of two witnesses.

THOMAS LEGGETT STURTEVANT,

Witnesses:
 WM. H. ELLIS,
 H. E. LODGE.